(12) United States Patent
Wang

(10) Patent No.: US 12,213,475 B1
(45) Date of Patent: Feb. 4, 2025

(54) INSECT AND FLY EXPELLING FAN CONVENIENT FOR STORAGE

(71) Applicant: Shenzhen Maichen Suchuang Technology Co., Ltd, Shenzhen (CN)

(72) Inventor: Haichao Wang, Shenzhen (CN)

(73) Assignee: Shenzhen Maichen Suchuang Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/527,411

(22) Filed: Dec. 4, 2023

(51) Int. Cl.
*A01M 29/18* (2011.01)
*A01M 1/20* (2006.01)

(52) U.S. Cl.
CPC .......... *A01M 29/18* (2013.01); *A01M 1/2016* (2013.01); *A01M 1/2033* (2013.01); *A01M 2200/012* (2013.01)

(58) Field of Classification Search
CPC .............. A01M 1/2016; A01M 1/2033; A01M 1/2055; A01M 2200/012; A01M 29/14; A01M 29/34; A01M 1/08
USPC .............................................................. 43/1
See application file for complete search history.

(56) References Cited

U.S. PATENT DOCUMENTS

| | | | | |
|---|---|---|---|---|
| 1,124,642 A * | 1/1915 | Nye | ........................ | A01N 27/00 43/113 |
| 7,310,907 B2 * | 12/2007 | Suteerawanit | ........ | A01M 29/34 43/107 |
| 10,265,431 B2 * | 4/2019 | Hafer | .................. | A01M 1/2055 |
| 2007/0011940 A1 * | 1/2007 | Chen | .................... | A01M 1/023 43/107 |

FOREIGN PATENT DOCUMENTS

| | | | | |
|---|---|---|---|---|
| CA | 2688976 A1 * | 6/2011 | ............. | A01M 1/08 |
| CN | 215123512 U * | 12/2021 | ............. | A01M 1/02 |
| EP | 4176716 A1 * | 5/2023 | ........... | A01M 1/023 |

* cited by examiner

*Primary Examiner* — Morgan T Jordan
*Assistant Examiner* — Danielle A Clerkley
(74) *Attorney, Agent, or Firm* — Jose Cherson Weissbrot

(57) ABSTRACT

An insect and fly expelling fan convenient for storage comprises a base and a host machine detachably connected to the base, wherein a storage cavity is formed in the middle of the base, and the storage cavity is hollow; an accommodating vessel is attached to the outer surface of the host machine or the base, the base and the host machine can pivot relative to each other, and the insect and fly expelling fan has a working state and an accommodated state through the detachable connection between the base and the host machine; when the insect and fly expelling fan is in working state, the host machine is connected and fixed on the top of the base through fasteners; when the insect and fly expelling fan is in the storage state, the host machine is stored in the base through the storage cavity.

14 Claims, 20 Drawing Sheets

INSECT AND FLY EXPELLING FAN CONVENIENT FOR STORAGE

TECHNICAL FIELD

The present invention relates to the technical field of fly-expelling fans, in particular to an insect and fly expelling fan convenient for storage.

BACKGROUND

In summer, fruit stalls and cooked food stalls will use insect and fly expelling fans, but the current insect and fly expelling fans are not detachable, which is inconvenient for storage, especially when a merchant has more than two products. When storing, the randomly placed insect and fly expelling fans occupy a very limited use area of the booth, which needs to be improved.

U.S. patent application Ser. No. 16/029,887 discloses a mosquito repellent fan, which has an accommodating vessel for holding a strip-shaped insect repellent or air freshener. The propeller of the fan rotates, and a pressure difference is generated just below the periphery of the fan, so that substances are diffused into the environment, thereby achieving the insect repellent effect. However, this kind of fan is bulky, its structure is non-detachable, it is not easy to store after use, and it is easy to occupy space.

China patent with the application number of 201822265482 discloses a fan for driving flies and mosquitoes, which comprises a fan shell, the shape of which is conical, the top of the cone of the fan shell is provided with fan blades, a driving motor is arranged in the fan shell, and a hook, a power installation slot and a power switch are arranged at the bottom of the cone of the fan shell. The insect and fly expelling fan only relies on the physical movement and reflection of the fan blades as a means of insect repellent, which has a small influence range and poor mosquito repellent effect.

Based on the above problems, the present invention provides a brand-new insect and fly expelling fan, which can be stored by disassembling the fan when not in use. At the same time, the fan has multiple mosquito repellent devices, which has a wide mosquito repellent range and good effect, and further improves the use experience.

SUMMARY

The present invention provides an insect and fly expelling fan convenient for storage, including a base and a host machine detachably connected to the base; and
  wherein, a storage cavity is formed in the middle of the base, and the storage cavity has a hollow structure; and
  wherein an accommodating vessel is attached to an outer surface of the host machine or the base, and the accommodating vessel is configured to store volatile drugs; and
  wherein, the base and the host machine are able to pivot relative to each other, and the insect and fly expelling fan convenient for storage has a working state and an accommodated state through the detachable connection between the base and the host machine; and
  when the insect and fly expelling fan convenient for storage is in the working state, the host machine is connected and fixed on a top of the base through a fastener; and
  when the insect and fly expelling fan convenient for storage is in the accommodated state, the host machine is accommodated in the base through the storage cavity.

The present invention also provides an insect and fly expelling fan convenient for storage, including a base and a host machine detachably connected to the base,
  wherein, a storage cavity is formed in the middle of the base, the storage cavity is of a hollow structure, a fixing device is formed in the storage cavity, and the host machine is detachably attached inside the storage cavity through the fixing device; and
  wherein, the base and the host machine can pivot relative to each other, and the insect and fly expelling fan convenient for storage has a working state and an accommodated state through the detachable connection between the base and the host machine; and
  when the insect and fly expelling fan convenient for storage is in the working state, the host machine is fixedly connected to the top of the base through a fastener; and
  when the insect and fly expelling fan convenient for storage is in the accommodated state, the host machine is accommodated in the base through the storage cavity.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the figures.

Figure 1:
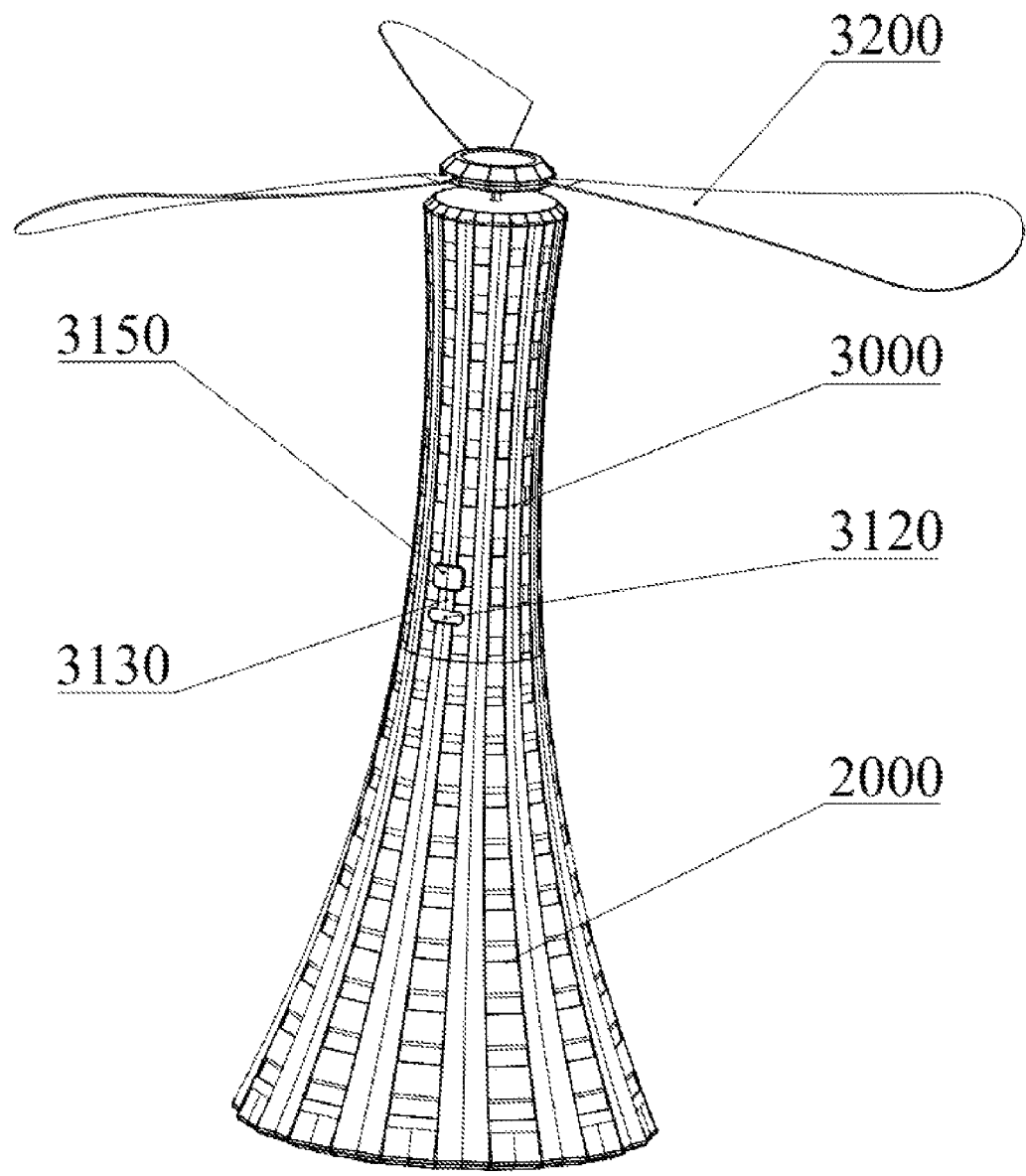
FIG. 1 is a schematic diagram of the working state of an insect and fly expelling fan convenient for storage in the application of the present invention.

2000, Base; 2001, mating part; 2002. Hand ring; 2003, Groove; 2004, External thread; 2100, Storage cavity; 2110, Fixture; 2120, Clamping table; 2130, Fixing buckle; 2200, Limiting step; 3000, Host machine; 3100, Casing; 3110, Buckling part; 3120, Charging interface; 3130, Lamp bead; 3140, PCB board; 3150, Switch; 3160, Internal thread; 3200, Fan blade; 3300, Motor; 3400, Accommodating vessel; 3410, Peripheral edge; 3420, Inner peripheral edge; 3430, Placing groove; 3440, First cover; 3450, Second cover; 3460, Through hole; 3470, Side wall; 3480, Opening and closing mechanism; 3500, Ultrasonic transmitter.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to." or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the application of the present invention, the application of the present invention provides an insect and fly expelling fan convenient for storage, so that the fan can be stored by disassembling the fan when not in use, and the mosquito repellent range of the fan is wide, and the effect is good.

Referring to FIG. 1, an insect and fly expelling fan convenient for storage includes a base 2000 and a host machine 3000 detachably connected to the base 2000, which can be pivoted relative to each other for disassembly and installation. The detachable connection between the base 2000 and the host machine 3000 enables the insect and fly expelling fan convenient for storage to have a working state and a storage state.

Figure 2:
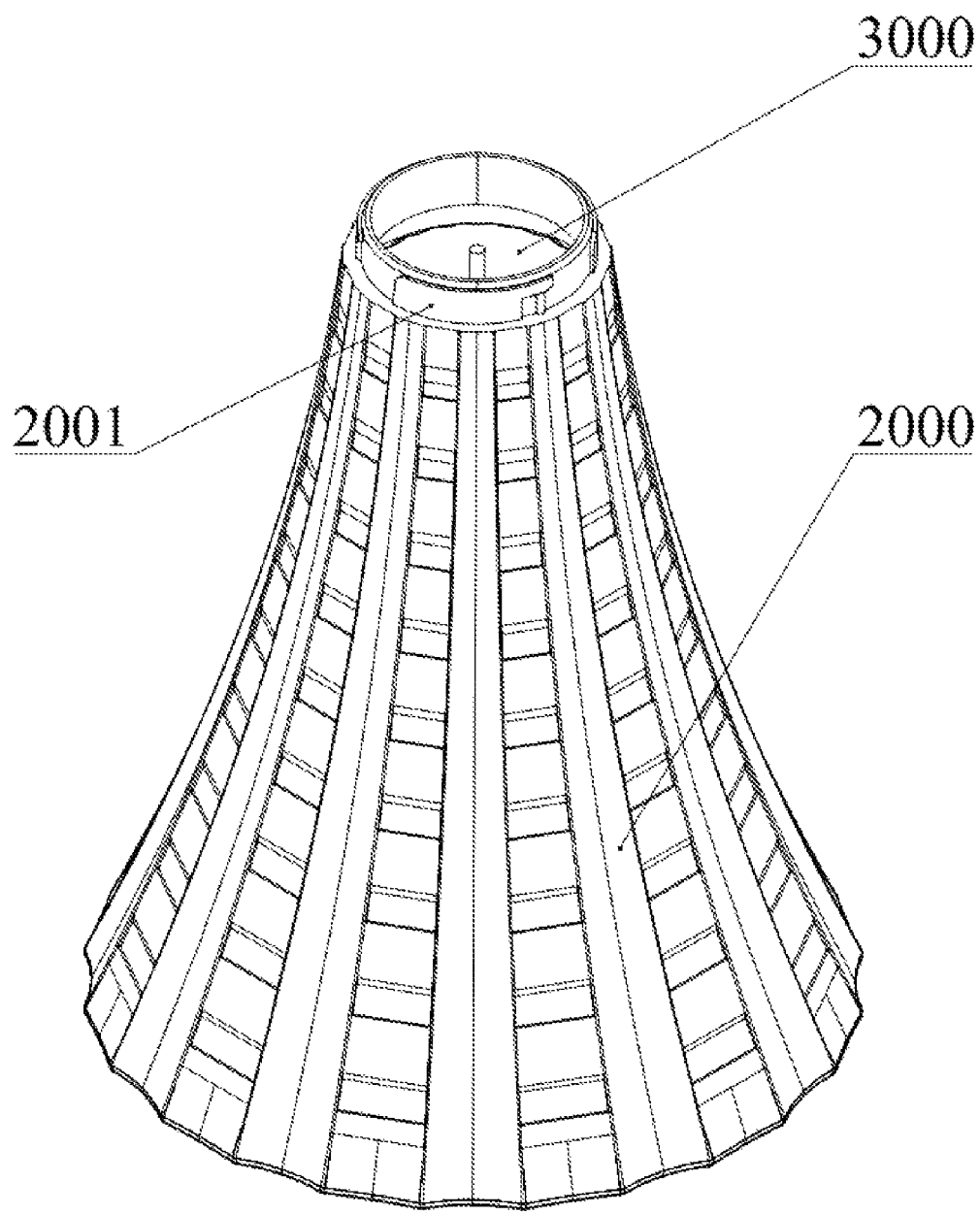
FIG. 2 is a schematic view of the accommodated state (with the blades removed) of the insect and fly expelling fan which is convenient for storage in the application of the present invention.

Referring to FIGS. 1 and 2, a storage cavity 2100 is formed in the middle of the base 2000. The storage cavity 2100 has a hollow structure. The storage cavity 2100 is defined as an accommodating space for accommodating the host machine 3000 to form an accommodating state. At the same time, a limiting step 2200 is formed at the top of the storage cavity 2100, which is used to form a limiting structure for the host machine 3000, so that the host machine 3000 is fixed in the storage cavity 2100.

Referring to FIG. 1, when the insect and fly expelling fan convenient for storage is in working state, the host machine 3000 is fixedly connected to the top of the base 2000 through a fastener.

Referring to FIG. 2, when the insect and fly expelling fan convenient for storage is in the accommodated state, the host machine 3000 is accommodated in the base 2000 through the storage cavity 2100.

Figure 5:
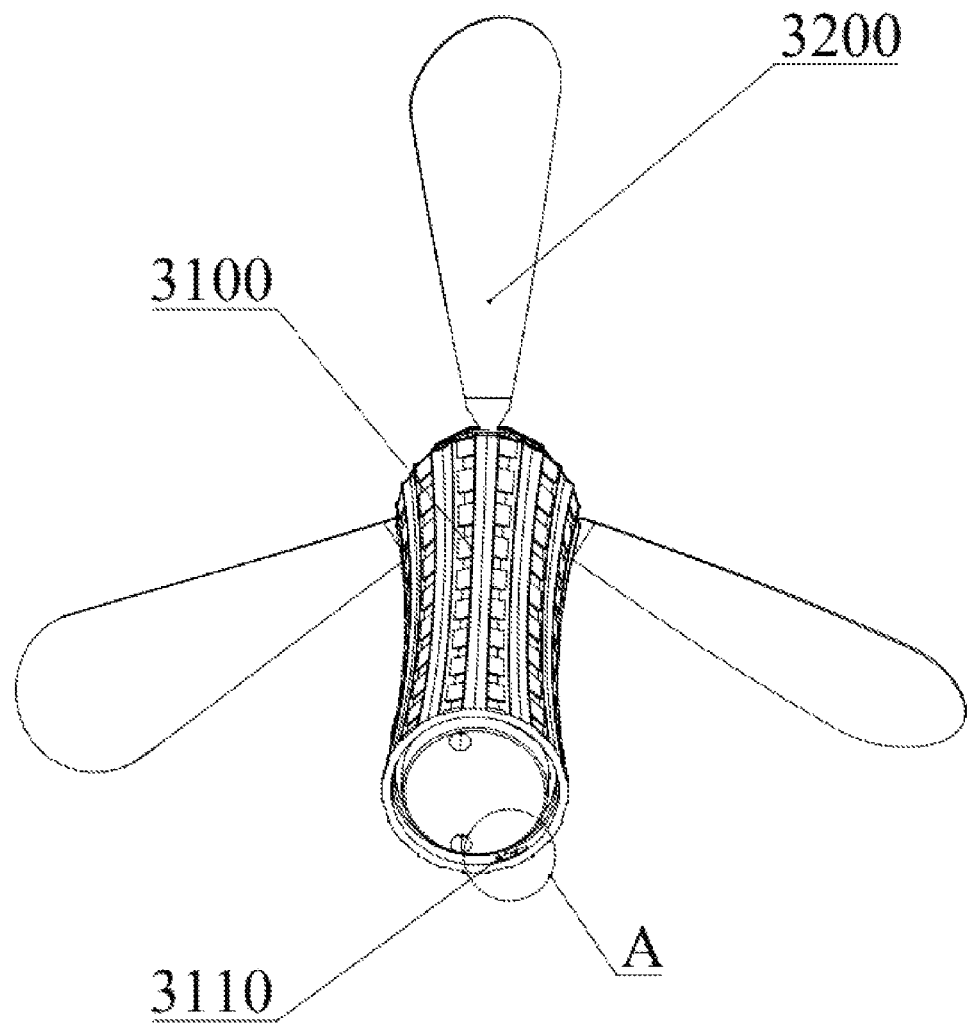
FIG. 5 is a schematic diagram of a host machine in the application of the present invention.
Figure 6:
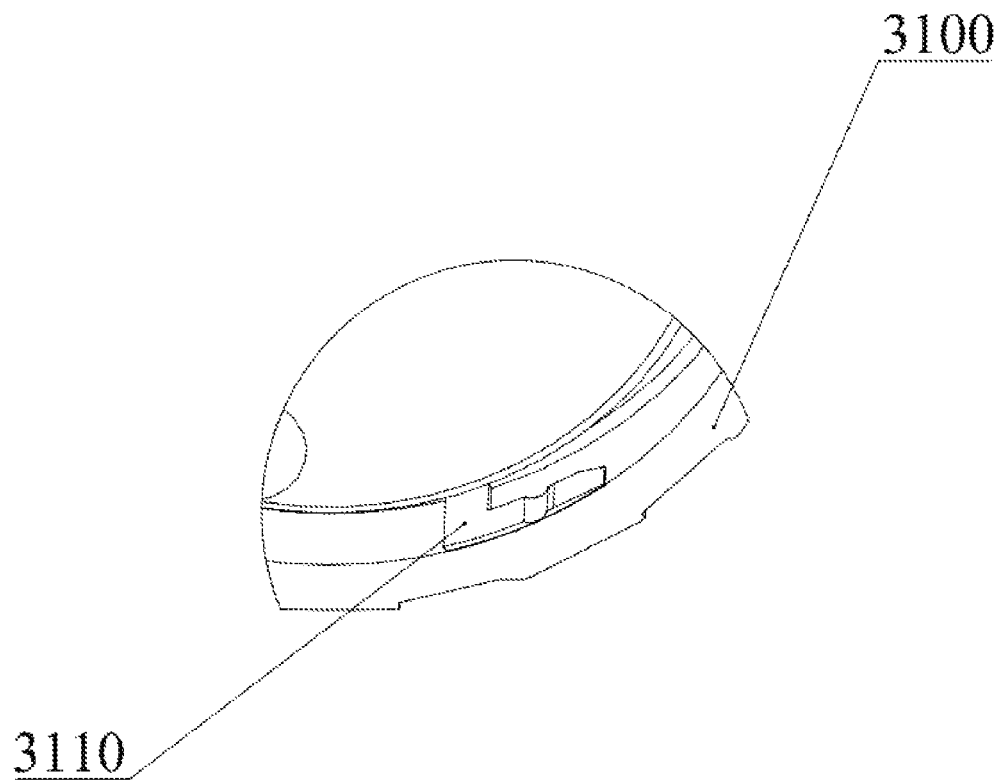
FIG. 6 is an enlarged schematic view at A in FIG. 5.
Figure 7:
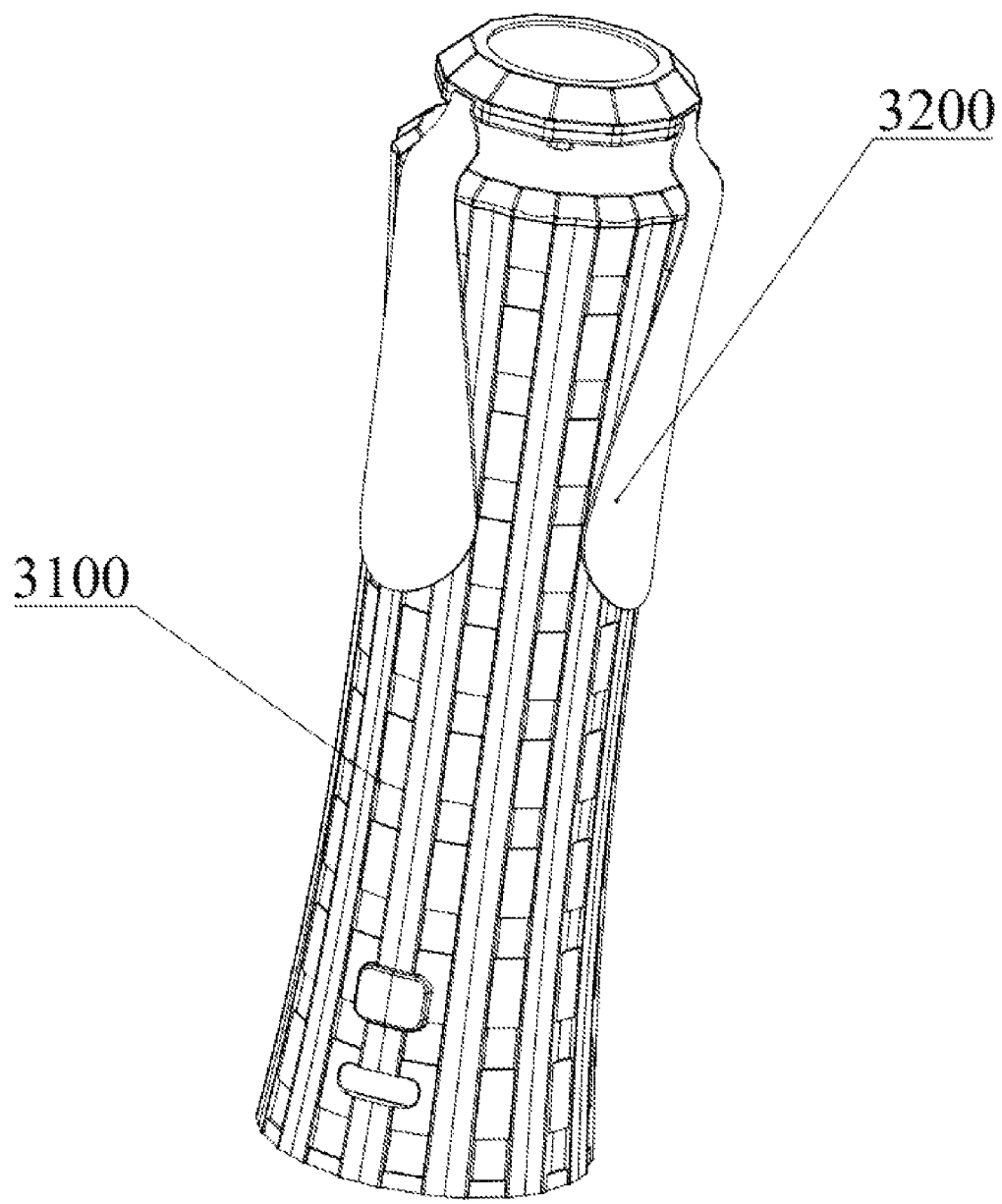
FIG. 7 is a schematic diagram of a fan blade in the application of the present invention.

Referring to FIGS. 1 and 5, the host machine 3000 includes a casing 3100 and fan blades 3200. In this embodiment, the number of fan blades 3200 is three and are made of a ductile material, and the fan blades 3200 can be bent and attached to the periphery of the casing 3100 (as shown in FIG. 7).

Figure 3:
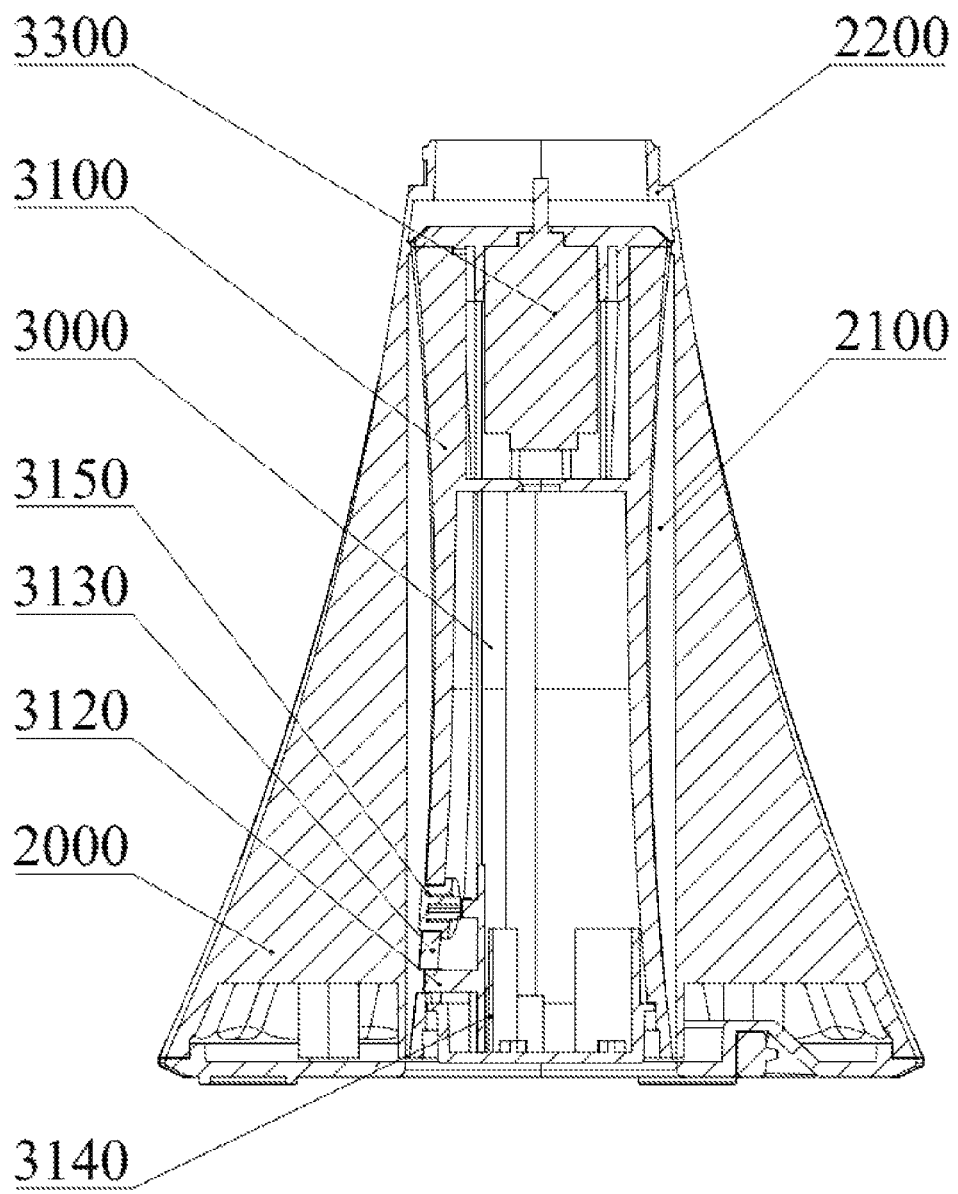
FIG. 3 is a sectional view of FIG. 2.
Figure 4:
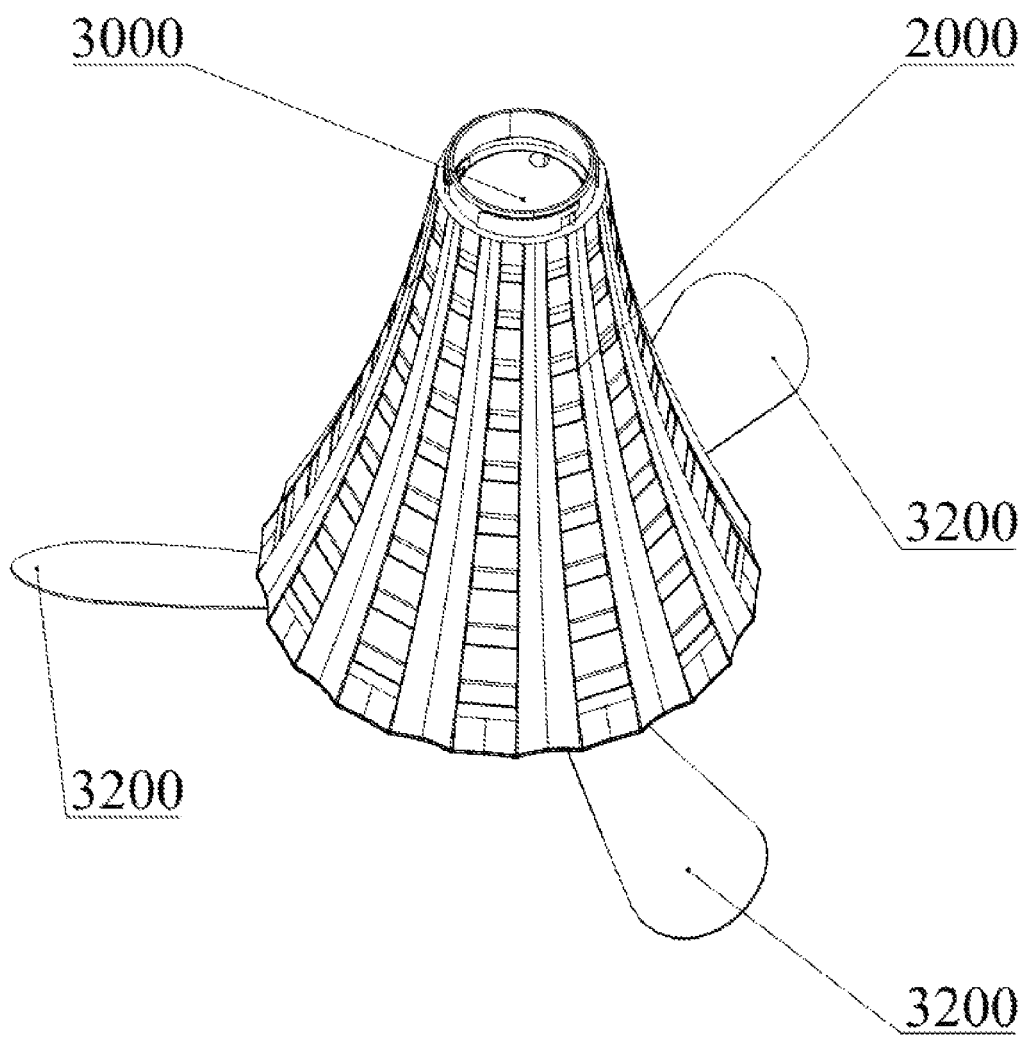
FIG. 4 is a schematic view of the accommodated state (without disassembling the blades) of the insect and fly expelling fan convenient for storage in the application of the present invention.

Referring to FIG. 1 and FIG. 3, the host machine 3000 further includes a motor 3300, which is arranged inside the casing 3100, and at least a part of the motor 3300 extends out of the casing 3100 and engages with the fan blade 3200.

Further, referring to FIG. 1, the bottom of the casing 3100 is provided with a charging interface 3120, a lamp bead 3130 and a battery, and the charging interface 3120 is electrically connected with the battery, and the lamp bead 3130 flashes when the battery is charged.

In some alternative embodiments (not shown in the figure), batteries include but are not limited to storage batteries, sodium batteries, magnesium batteries, seawater batteries, glass batteries, fuel batteries, zinc-bromine batteries and other batteries or power supply sources.

Further, as shown in FIGS. 1 and 3, a PCB board 3140 is fixed inside the casing 3100, and a switch 3150 is arranged outside, wherein both the switch 3150 and the motor 3300 are electrically connected with the PCB board 3140, and the switch 3150 controls the operation of the motor 3300 through the PCB board 3140.

In this embodiment, the charging interface 3120, the lamp bead 3130 and the switch 3150 are in the same position, and they are close to each other. The switch 3150 is a key switch. In other embodiments (not shown in the figure), the switch 3150 can be a physical button, such as a rocker, a dial, a slide switch, a touch switch, a toggle switch and a joystick, a click wheel, etc. In some alternative embodiments (not shown in the figure), the switch can also be coupled to any of the following (or uncoupled): a keyboard, an infrared port, a USB port and a pointing device, such as a mouse. In some embodiments (not shown in the figure), the switch can also be an electronic device, such as a touch screen, a computer device and other control system devices.

Similarly, in other embodiments (not shown in the figure), the circuits on the PCB board 3140 include well-known circuits for performing functions, including but not limited to an antenna system, an RF transceiver, one or more amplifiers, a tuner, one or more oscillators, a digital signal processor, a CODEC chipset, a subscriber identity module (SIM) card, a memory, and the like.

In this embodiment, referring to FIGS. 2 and 5, the base 2000 and the host machine 3000 are detachably connected by rotating and fastening, wherein the lower part of the casing 3100 is formed with a buckling part 3110, and the upper part of the base 2000 is formed with a mating part 2001 corresponding to the buckling part 3110.

Figure 9:
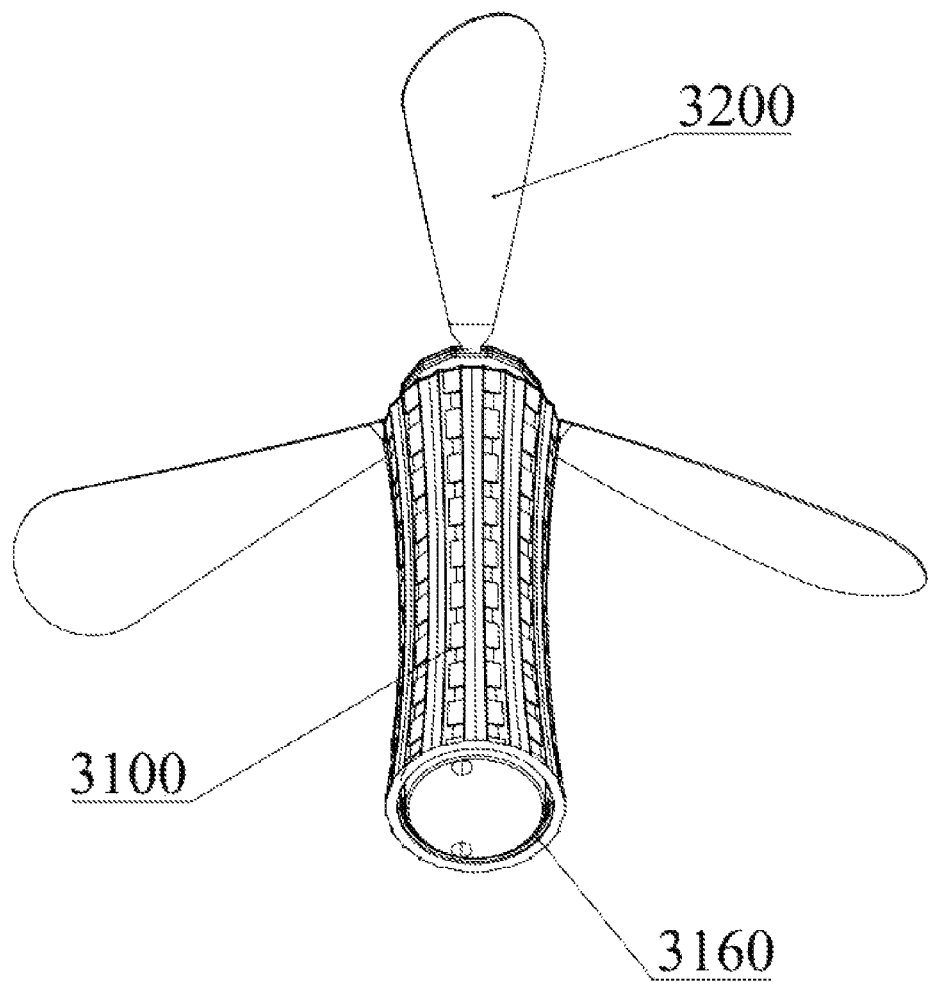
FIG. 9 is a schematic diagram of another embodiment of the casing in the application of the present invention.
Figure 10:
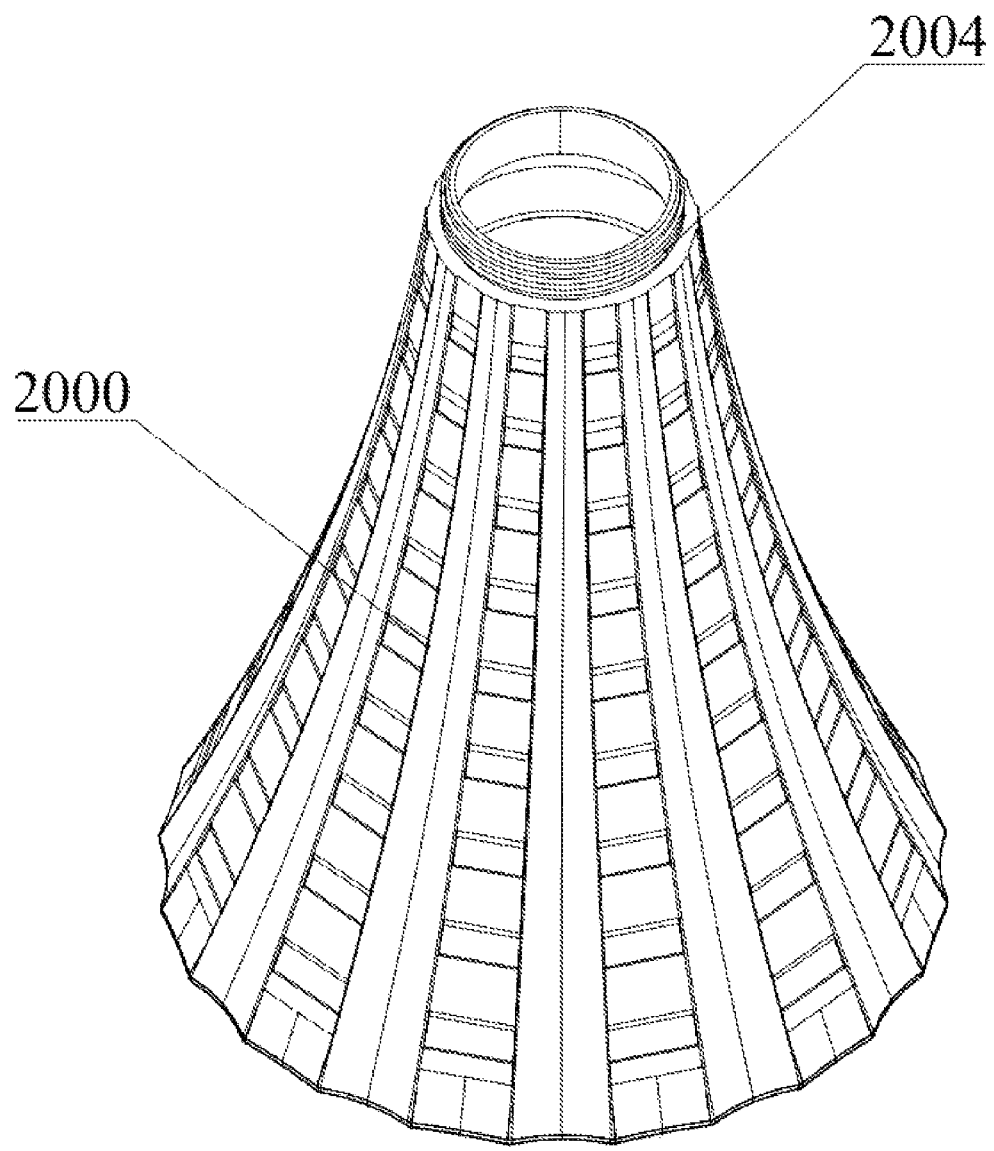
FIG. 10 is a schematic diagram of another embodiment of the base in the application of the present invention.

In another embodiment, referring to FIGS. 9 and 10, the base 2000 and the host machine 3000 are detachably connected by rotating threads, wherein the lower part of the casing 3100 is provided with an internal thread 3160, and the upper part of the base 2000 is provided with an external thread 2004 matching with the internal thread 3160. In other embodiments (not shown in the figure), the connection mode can also be a snap connection, or a magnetic connection, or a pin connection.

Figure 8:
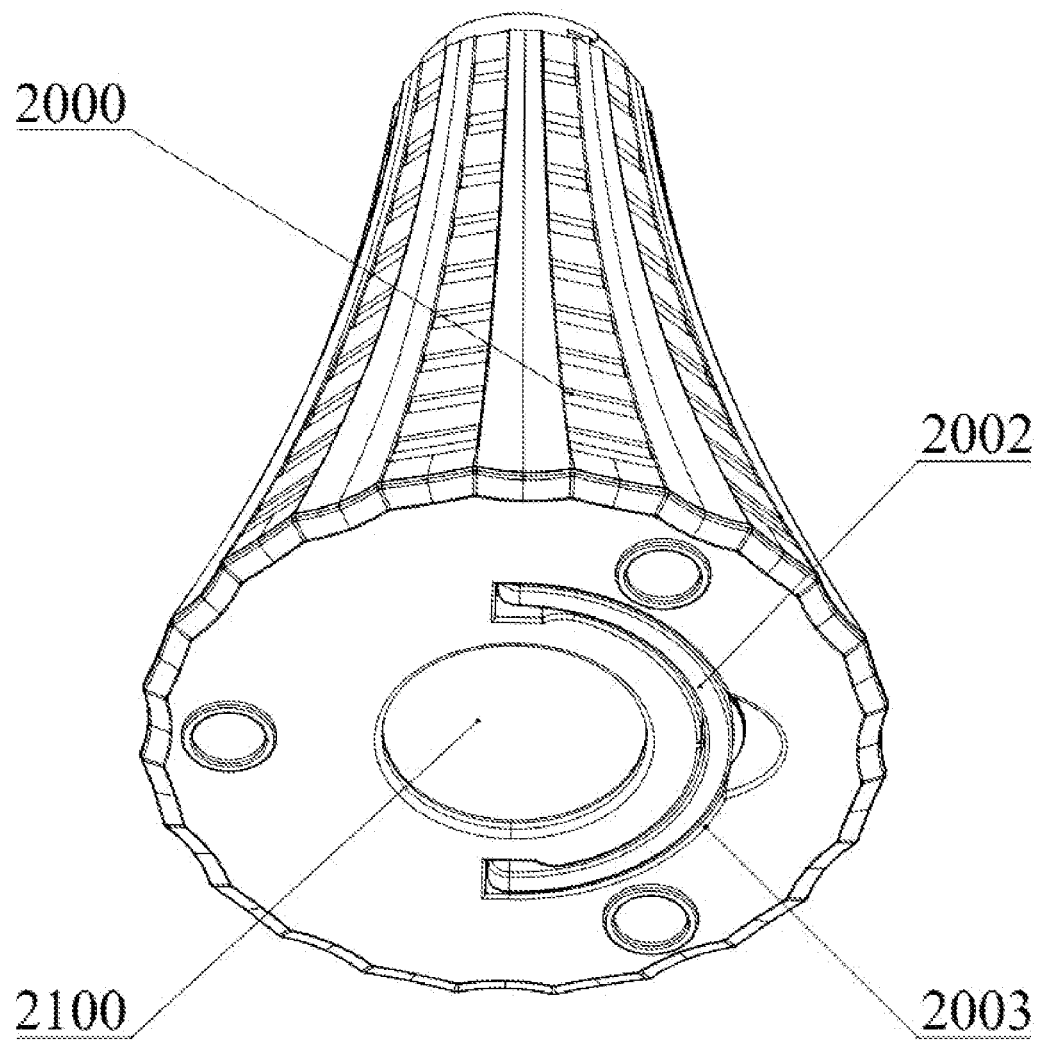
FIG. 8 is a schematic diagram of the base in the application of the present invention.

Referring to FIG. 8, the bottom of the base 2000 is provided with a handle ring 2002 and a groove 2003. The handle ring 2002 is made of a ductile material, and the shape and structure of the handle ring 2002 and the groove 2003 are both semicircular structures, and the sizes of the handle ring 2002 are matched, and the handle ring 2002 can be rotatably accommodated in the groove 2003.

In other embodiments (not shown in the figure), the shape of the handle ring 2002 and the groove 2003 can also be diamond, oval, or any other geometric structure, curved and irregular shape structure.

Figure 12:
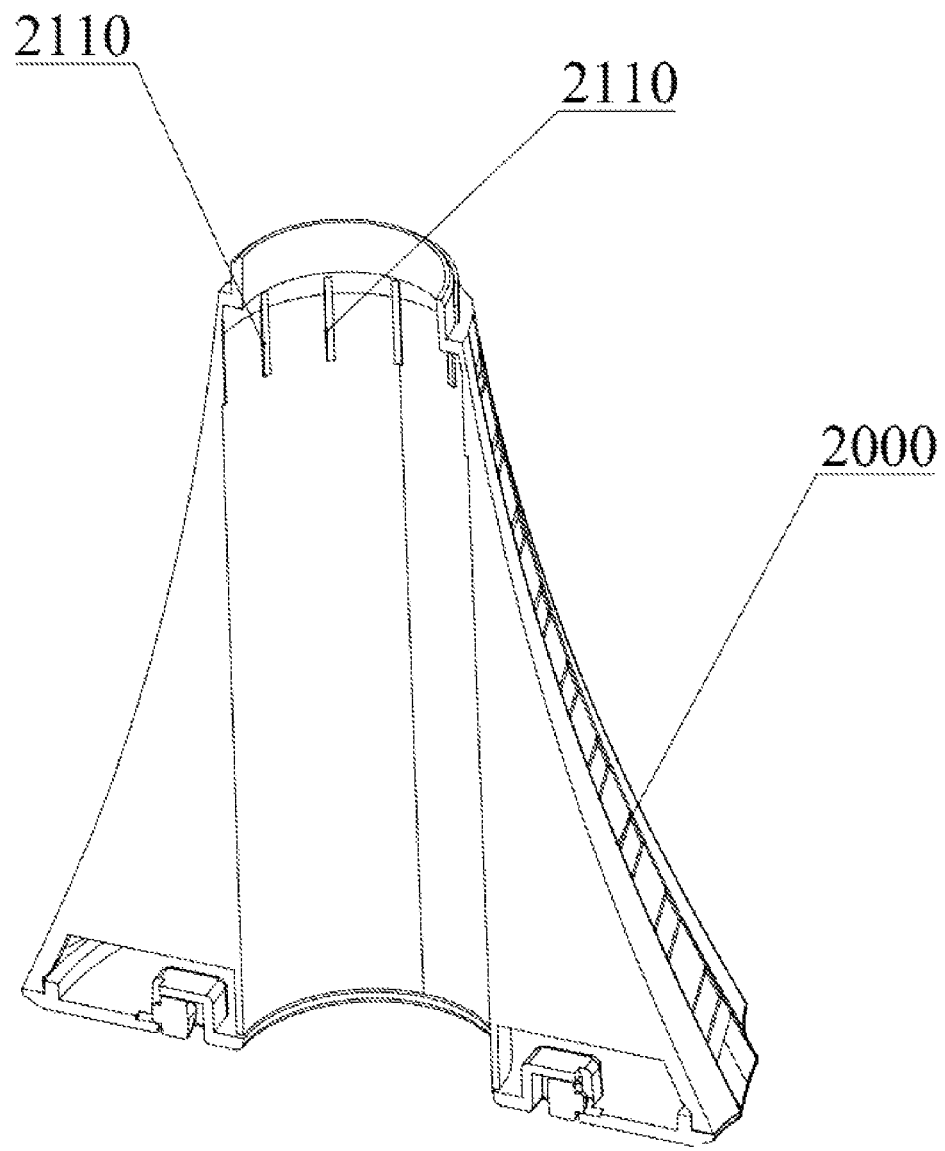
FIG. 12 is a schematic sectional view of the base in the application of the present invention.

Further, the storage cavity 2100 is also provided with fixing devices. In this embodiment, as shown in FIG. 12, the fixing devices are a plurality of fixtures 2110, and the fixtures 2110 are strip-shaped structures and made of flexible materials. In this embodiment, the fixture 2110 is made of a rubber material. When the host machine 3000 is accommodated in the storage cavity 2100, the fixture 2110 will clamp the host machine 3000 by its own friction, so that the host machine 3000 can be stably accommodated in the storage cavity 2100.

Figure 13:
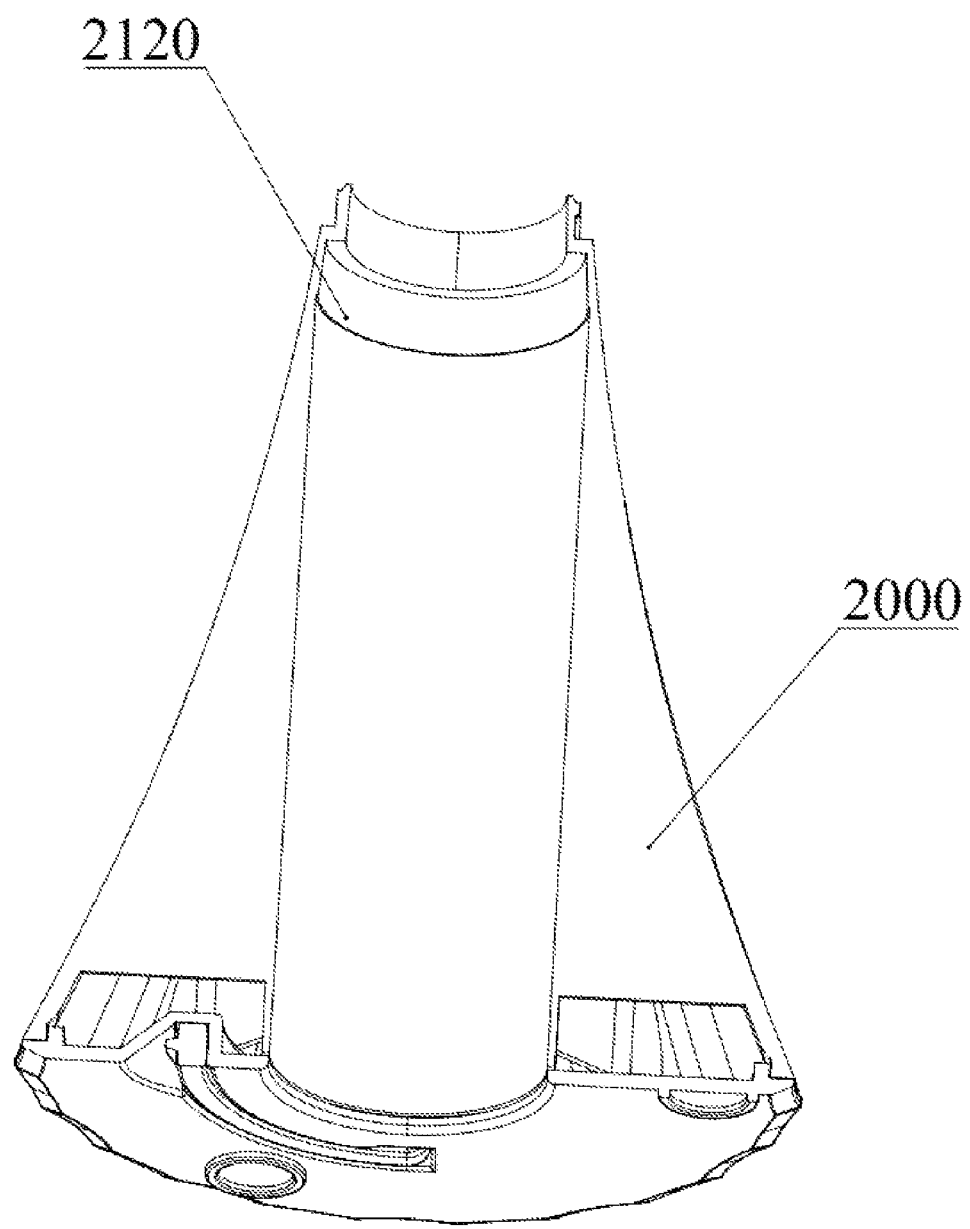
FIG. 13 is a schematic sectional view of another embodiment of the base in the application of the present invention.

In some embodiments, referring to FIG. 13, the fixing device can also be arranged as a clamping table 2120, which is a convex structure arranged around the inner wall of the storage cavity 2100, and the host machine 3000 can be clamped by the clamping table 2120.

Figure 14:
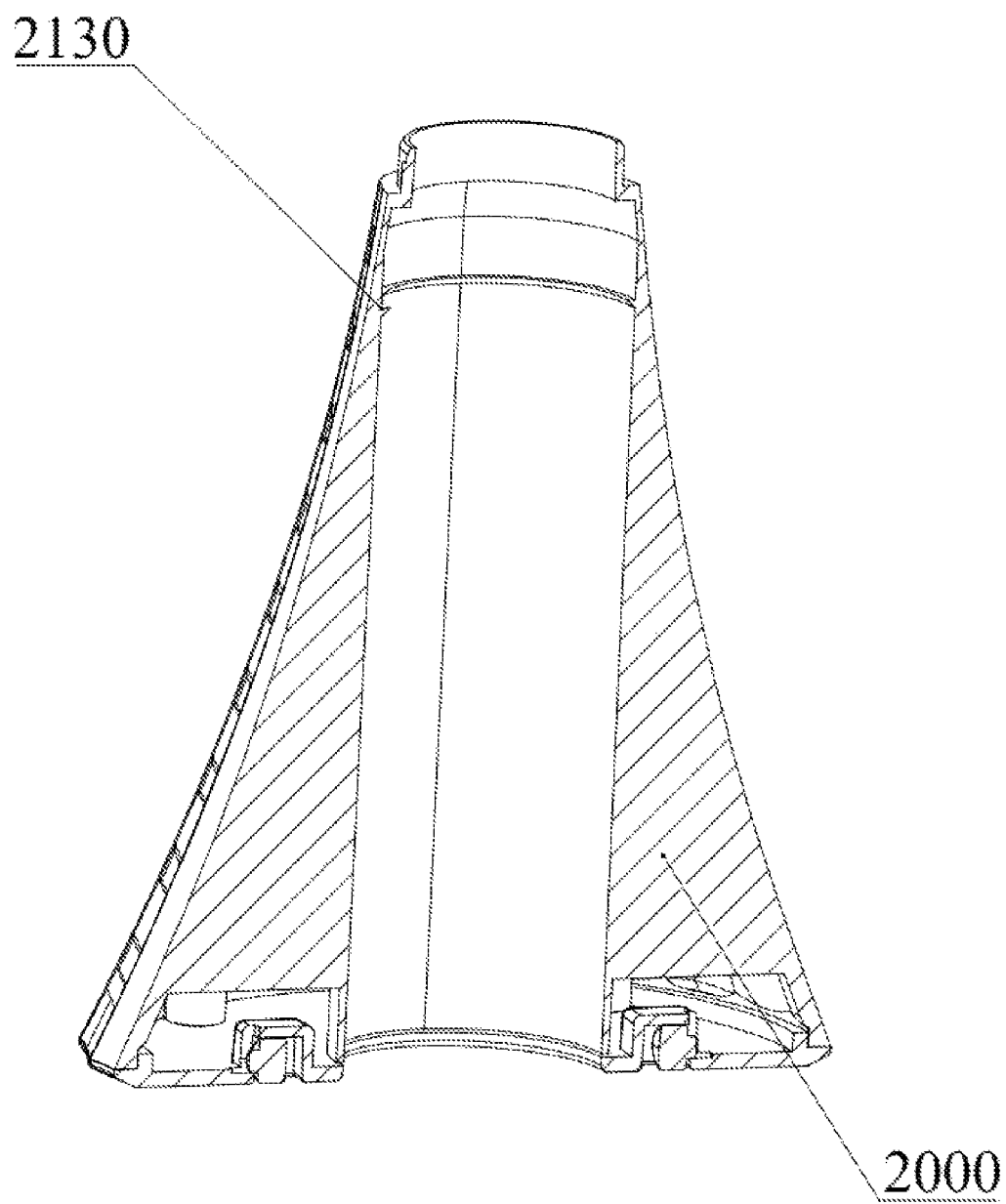
FIG. 14 is a schematic sectional view of another embodiment of the base in the application of the present invention.

In another embodiment, referring to FIG. 14, the fixing device is a fixing buckle 2130 extending from the inner wall of the storage cavity 2100, and the cross-sectional shape of the fixing buckle 2130 is triangular. When the host machine 3000 is accommodated in the storage cavity 2100, the fixing buckle 2130 can form a snap connection with the host machine 3000.

In other embodiments (not shown in the figure), the cross-sectional shape of the fixing buckle 2130 may be a diamond, a rectangle, a square, or other irregular and character shapes. At the same time, the fixing device can also be connected and fixed by setting magnetic connection, bolt connection or threaded connection, as long as the host machine 3000 can be fixedly accommodated in the storage cavity 2100.

In other embodiments (not shown in the figure), the structure of the fixture 2110 can be a circular structure, a square structure, a diamond structure, other irregular structures, or various character structures. Meanwhile, the material of the fixture 2110 can also be asbestos friction material, semi-metal friction material. NAO friction material, polyvinyl alcohol, polyester, polyimide, polyethylene naphthalate glycol ester, paper, textile material, or other high friction materials such as polydimethylsiloxane, as long as the shape and material of the fixture 2110 can fix the host machine 3000.

Specifically, as shown in FIGS. 1 to 8, when it is necessary to use the insect and fly expelling fan convenient for storage, the host machine 3000 is detachably connected above the base 2000 through the mating part 2001 and the buckling part 3110. At this time, the fan blade 3200 is installed at one end far away from the base 2000, so that the insect and fly expelling fan convenient for storage is in working condition, and the switch 3150 is started to rotate the fan blade 3200 to carry out insect repellent work.

When it is necessary to accommodate the insect and fly expelling fan which is convenient for storage, the host machine 3000 is detached from the top of the base 2000, and the host machine 3000 can be inserted into the storage cavity 2100 from bottom to top after being detached. The storage cavity 2100 has a fixing device and a limiting step 2200. When the host machine 3000 is embedded in the storage cavity 2100, the limiting step 2200 will limit the host machine 3000 so that the host machine 3000 can be fixed at the same position, and the fixing device can stably connect the host machine 3000 in the storage cavity 2100 through friction. At this time, the insect and fly expelling fan convenient for storage is in the storage state, and the fan blade 3200 can be attached to the casing 3100 or close to the bottom of the base 2000 in the working state.

Figure 15:
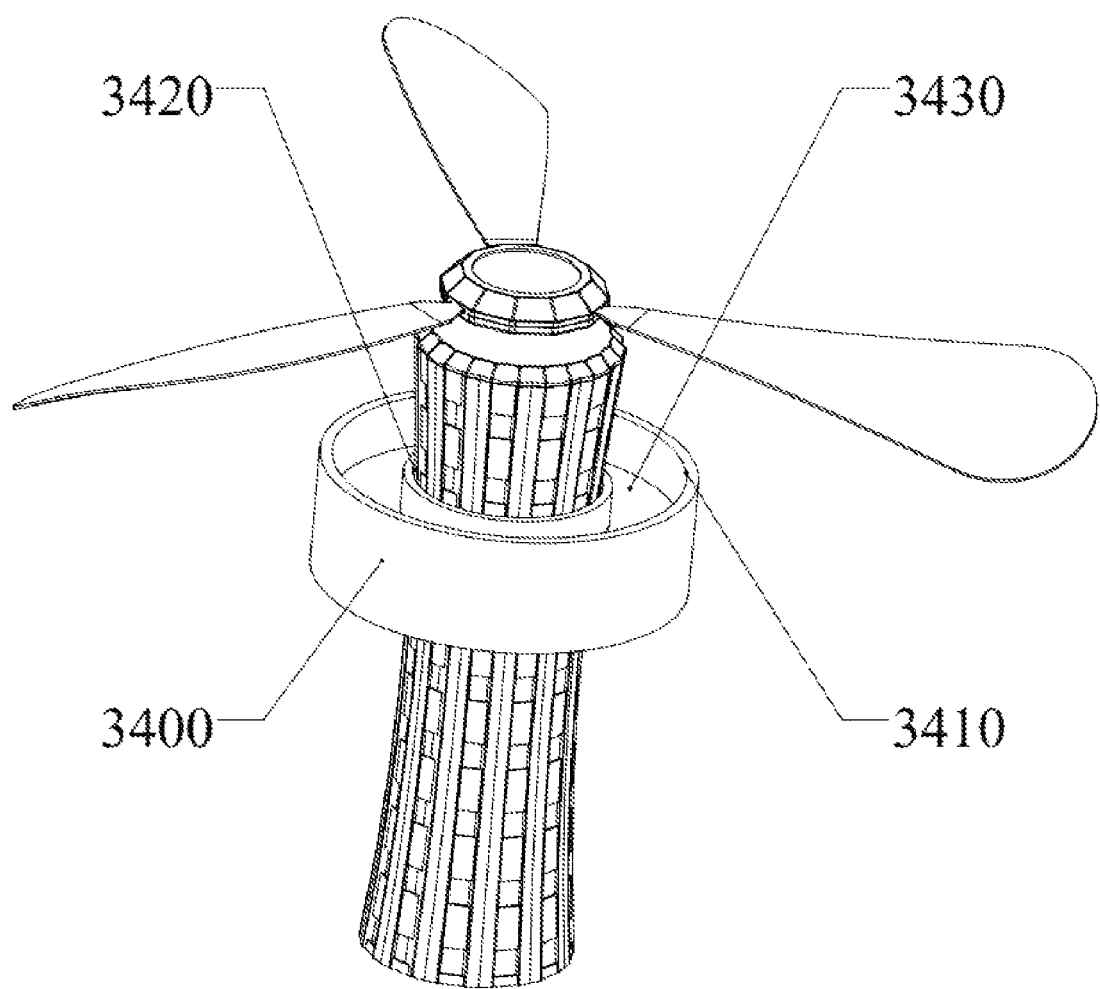
FIG. 15 is a schematic diagram of another preferred embodiment in the application of the present invention.

As a preferred embodiment of the application of the present invention, as shown in FIG. 15, the application of the present invention also provides another insect and fly expelling fan convenient for storage, and the fan is added with an accommodating vessel 3400 and an ultrasonic transmitter 3500 on the basis of the original structure.

Figure 16:
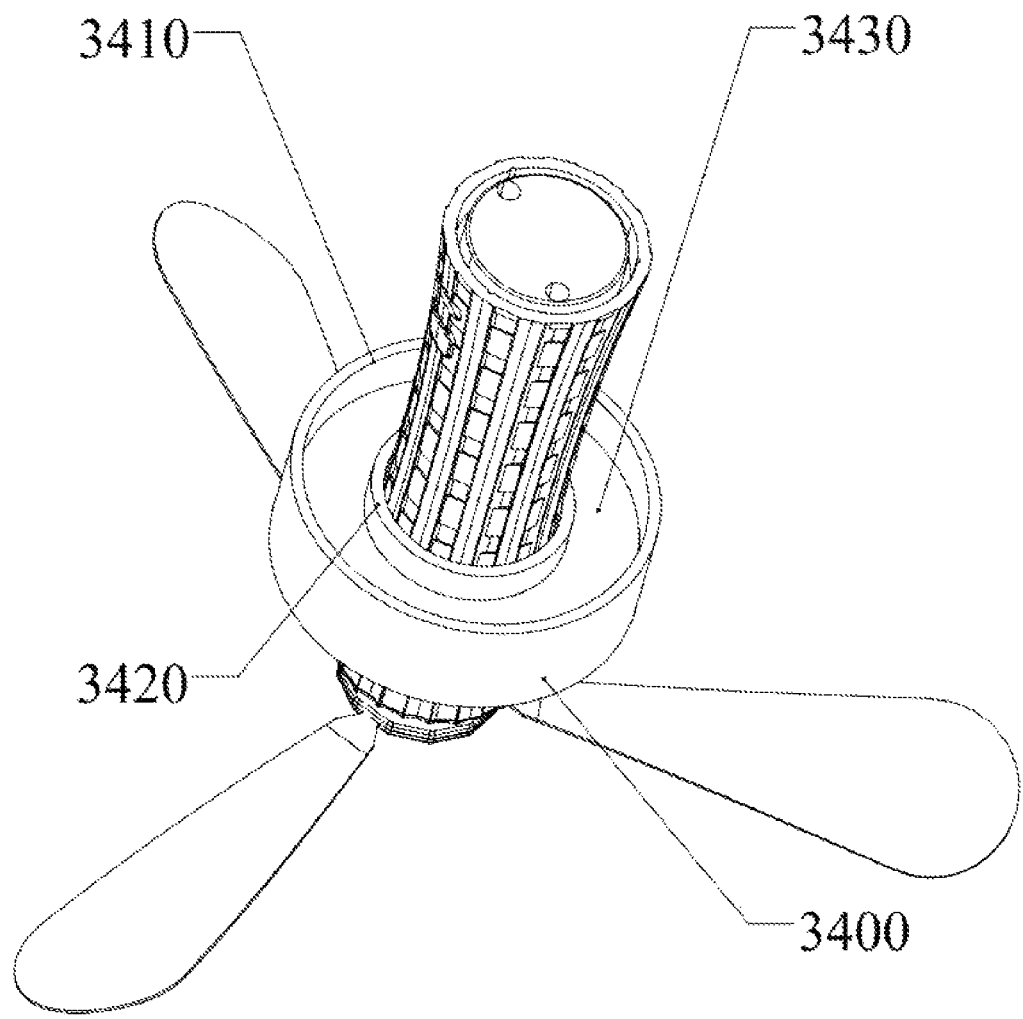
FIG. 16 is a schematic diagram of another preferred embodiment in the application of the present invention.

Referring to FIGS. 15 and 16, the accommodating vessel 3400 is attached to the host machine 3000 and has an outer peripheral edge 3410 and an inner peripheral edge 3420, wherein the inner peripheral edge 3420 is attached to the outer wall of the host machine 3000, and the height of the outer peripheral edge 3410 is higher than that of the inner peripheral edge 3420.

In some alternative embodiments (not shown in the figure), the attachment relationship can be a fixed connection, a detachable connection, or an integral connection: it can be a mechanical connection or an electrical connection; it can be a direct connection, can also be indirect connection through an intermediate medium, and communication inside two elements.

Further, the outer peripheral edge 3410 and the inner peripheral edge 3420 form a placing groove 3430. Because the accommodating vessel 3400 has a symmetrical structure, the upper and lower ends of the accommodating vessel 3400 are provided with placing grooves 3430, and the accommodating vessel 3400 is configured to store insect repellent sheets and repel insects by volatilization of the insect repellent sheets.

Figure 17:
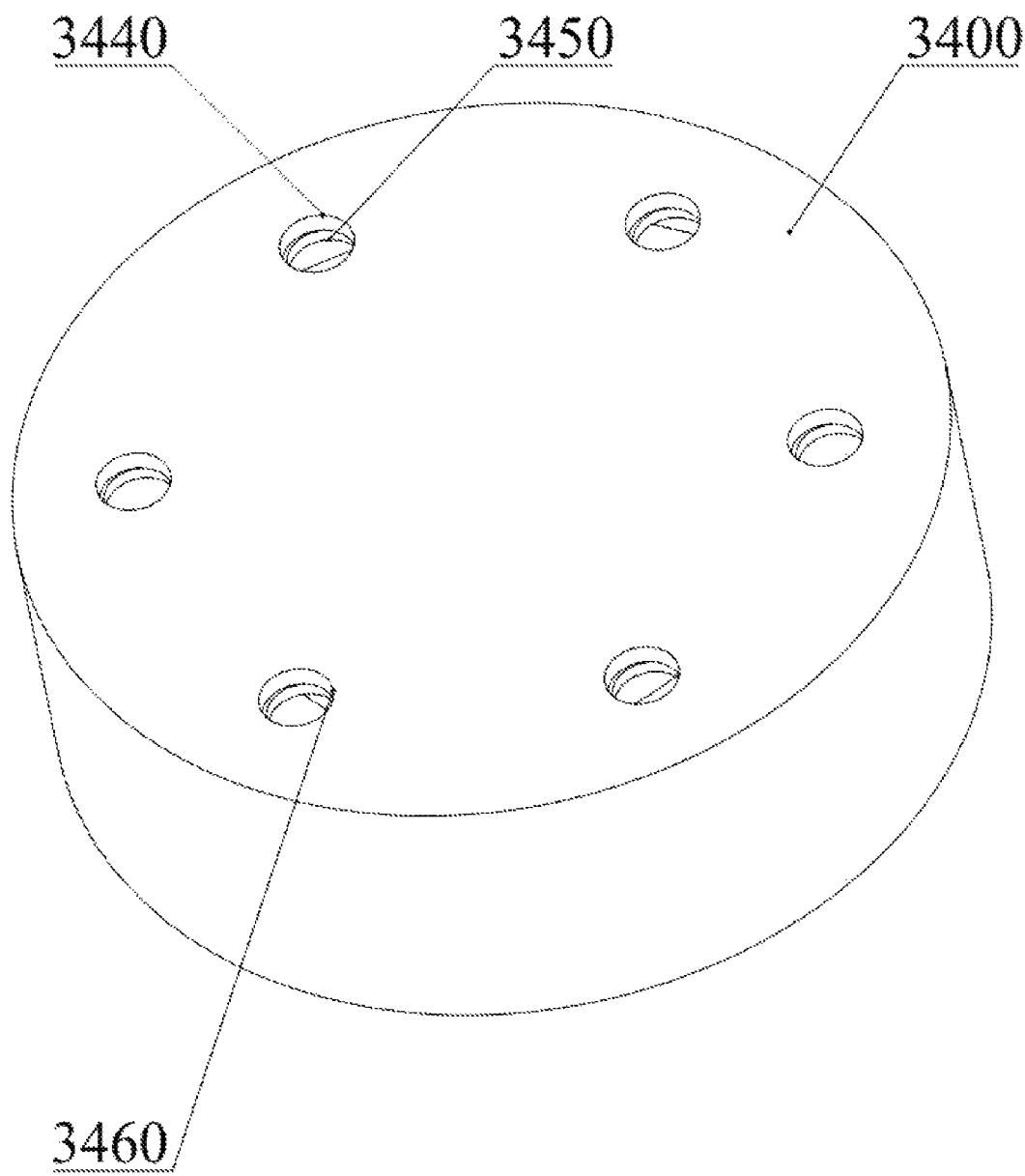
FIG. 17 is a schematic diagram of the volatilization state of the accommodating vessel in the application of the present invention.
Figure 18:
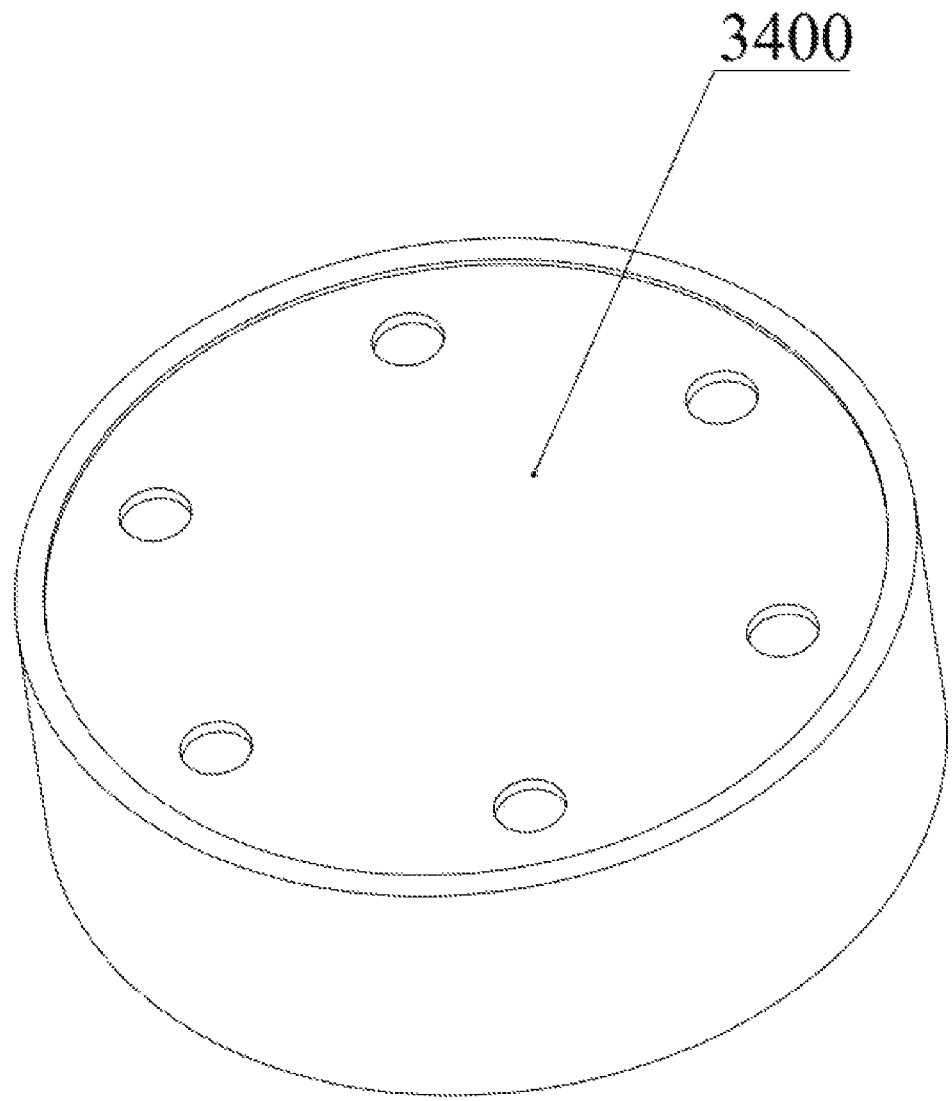
FIG. 18 is a schematic view of the closed state of the accommodating vessel in the application of the present invention.

In another embodiment, as shown in FIGS. 17 and 18, the accommodating vessel 3400 is also provided with at least two covers, wherein the covers are a first cover 3440 and a second cover 3450, and the first cover 3440 and the second cover 3450 are both provided with a plurality of through holes 3460, and the through holes 3460 are uniformly arranged around the surfaces of the first cover 3440 and the second cover 3450. The through holes 3460 ARE used for volatilizing the medicine in the accommodating vessel 3400.

Further, the first cover 3440 and the second cover 3450 can rotate relative to each other, and the first cover 3440 is located above the second cover 3450, so that the accommodating vessel 3400 has a volatile state and a closed state.

As shown in FIG. 17, when the through holes 3460 on the first cover 3440 and the second cover 3450 are located at the same position, the accommodating vessel 3400 is in a volatile state, and the drug in the accommodating vessel 3400 can be volatilized through the through hole 3460 to repel mosquitoes. At the same time, the speed of volatilization can be changed by changing the overlapping position of the through holes 3460.

As shown in FIG. 18, when the through holes 3460 on the first cover 3440 and the second cover 3450 are not in the same position, the accommodating vessel 3400 is in a closed state, and the medicine in the accommodating vessel 3400 is stored in the accommodating vessel 3400.

Figure 19:
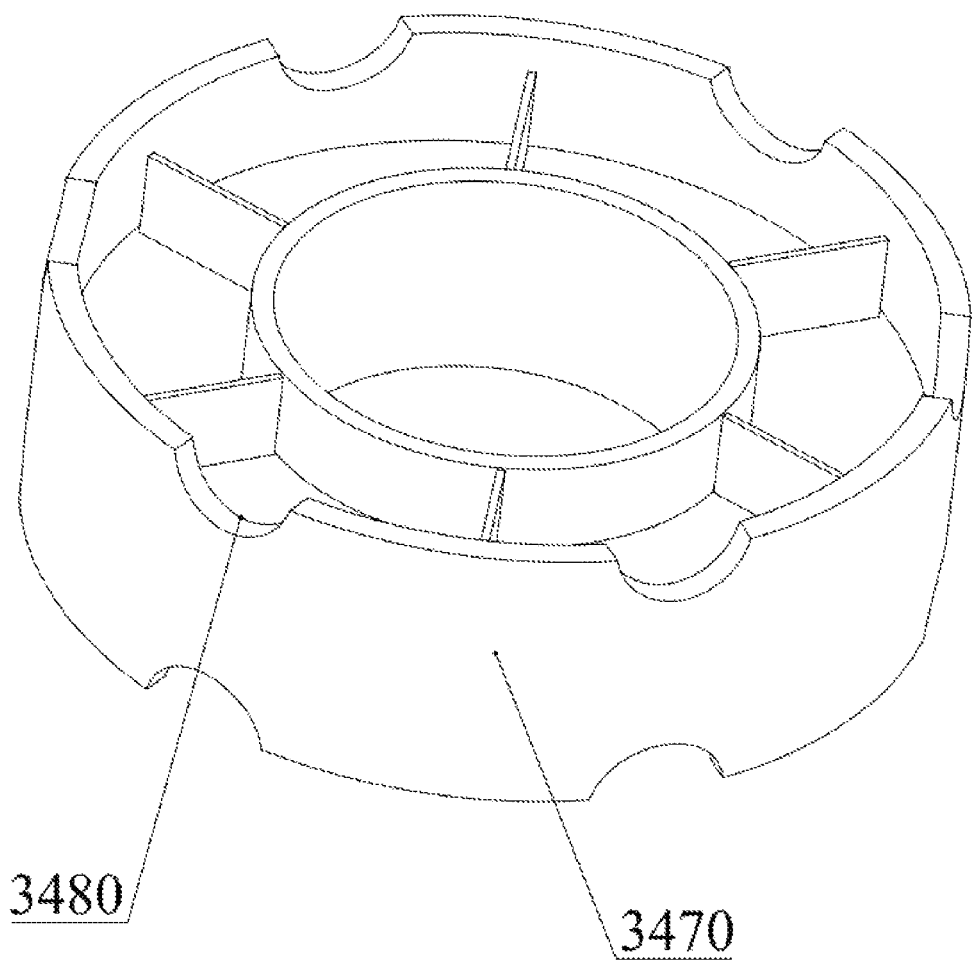
FIG. 19 is a schematic view of the accommodating vessel in the application of the present invention.

In another embodiment, as shown in FIG. 19, the accommodating vessel 3400 has a side wall 3470 and an opening and closing mechanism 3480. The inside of the accommodating vessel 3400 is divided into several equal parts, and the side wall 3470 can be opened and closed by the opening and closing mechanism 3480, so that the accommodating vessel 3400 has an adding state and a sealing state. When the side wall 3470 is opened by the opening and closing mechanism 3480, the accommodating vessel 3400 is now in a state of being added: when the side wall 3470 is closed by the opening and closing mechanism 3480 and the side wall 3470 is engaged with the accommodating vessel 3400, the accommodating vessel 3400 is in a sealing state at this time.

Referring to FIG. 1 to FIG. 16, in this embodiment, the insect and fly expelling fan convenient for storage is of a rotating structure, while the storage cavity 2100 and the host machine 3000 are of an approximately cylindrical structure. The overall structure of the base 2000 is a conical part which gradually decreases from the bottom to the top, while the diameter of the storage cavity 2100 gradually decreases from the bottom to the top.

Figure 11:
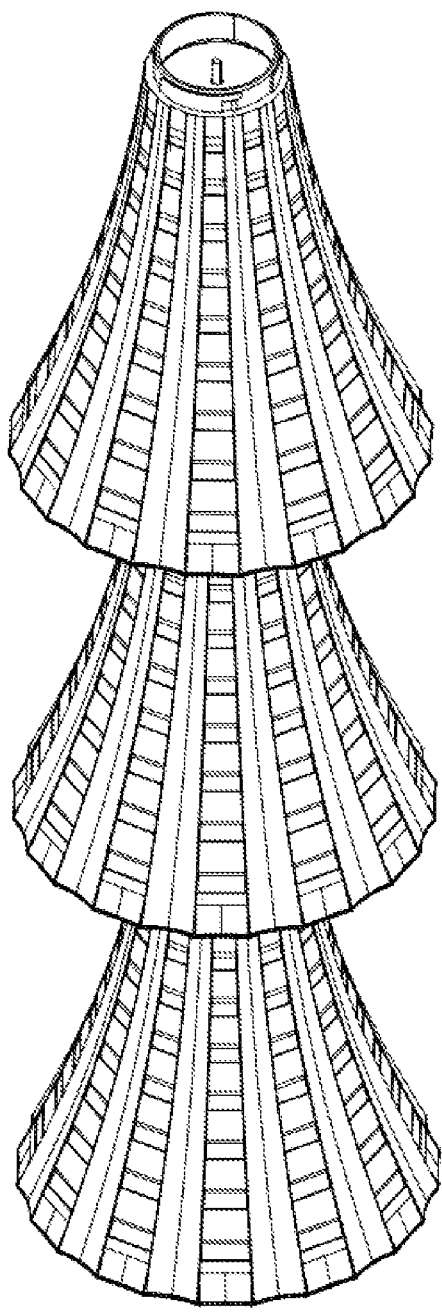
FIG. 11 is a schematic diagram of stacking and storing a plurality of insect and fly expelling fans convenient for storage.

Specifically, as shown in FIG. 11, the maximum diameter of the host machine 3000 is equal to the diameter of the top of the storage cavity 2100, so that the host machine 3000 can be embedded and fixed in the storage cavity 2100. The diameter of the upper end of the base 2000 is smaller than the maximum diameter of the storage cavity 2100, so the base 2000 can be stacked in multiple ways, wherein at least a part of the base 2000 can be embedded and fixed in the storage cavity 2100 when the base 2000 is stacked.

Figure 20:
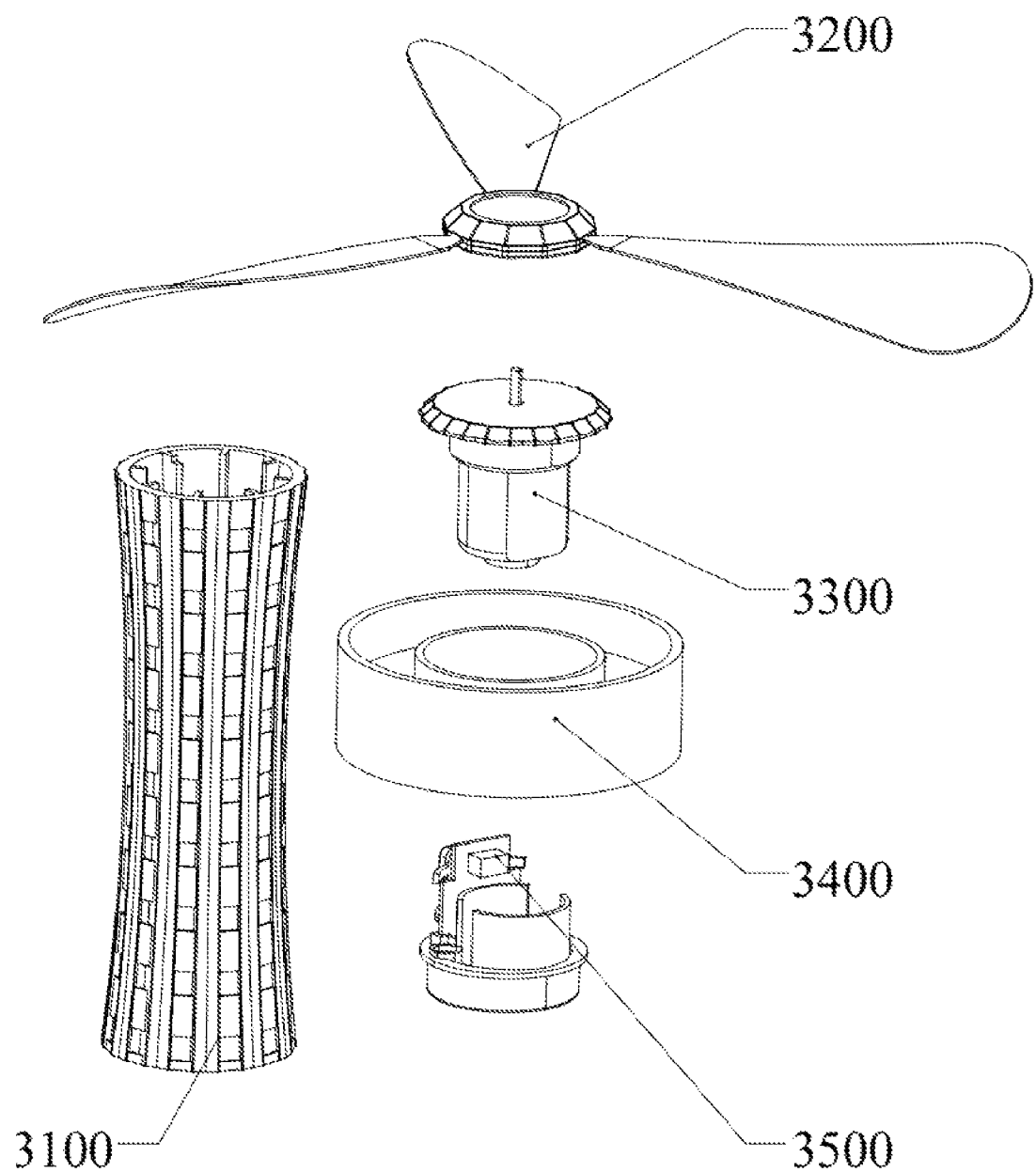
FIG. 20 is an exploded view of the host machine in the application of the present invention.

Referring to FIG. 20, the ultrasonic transmitter 3500 is used to emit ultrasonic waves to repel mosquitoes, and the ultrasonic transmitter 3500 can emit ultrasonic waves with a frequency of 20 KHZ-70 KHZ. The ultrasonic transmitter 3500 is fixed on the PCB board 3140 and electrically connected with the PCB board 3140. At the same time, the ultrasonic transmitter 3500 communicates with the switch 3150, which can control the opening and closing of the ultrasonic transmitter 3500.

In other embodiments (not shown in the figure), the ultrasonic transmitter 3500 can also be controlled by a network system circuit, a controller or a mobile device to adjust the sound wave value emitted by the ultrasonic transmitter 3500.

In other embodiments (not shown in the figure), the controller or mobile device includes, but is not limited to, a mobile phone, such as Apple's iPhone®, other portable electronic devices, such as Apple's iPod Touches® and Apple's iPad®, and the mobile device operating system based on Google's Android, as well as any other portable electronic device, including software, firmware, hardware or their combination, which can at least receive signals, decode (if necessary) and exchange information with the server to verify information. Typical components of a mobile device may include, but are not limited to, permanent memory such as flash ROM, random access memory such as SRAM, camera, battery. LCD driver, display, cellular antenna, speaker, Bluetooth circuit and WIFI circuit, wherein the permanent memory may contain programs, applications and/or operating systems for mobile devices. The mobile device may be a secret key, which can be a secret key of a security token, which is a small hardware device with built-in authentication mechanism and is used to manage and protect access to network services, data, provide access, and communicate with devices.

In other embodiments (not shown in the figure), the network system circuit is used to receive and send signals, including but not limited to RF, also known as electromagnetic signals. The network system circuit converts electrical signals into/from electromagnetic signals and communicates with communication networks and other communication devices through electromagnetic signals. Network system circuits may include well-known circuits for performing these functions, including but not limited to antenna systems. RF transceivers, one or more amplifiers, tuners, one or more oscillators, digital signal processors, CODEC chipsets, subscriber identity module (SIM) cards, memories, and the like. The network system circuit can communicate with a network, such as the Internet, also known as the World Wide Web (WWW), an intranet and/or a wireless network, such as a cellular telephone network, a wireless local area network (LAN) and/or a metropolitan area network (MAN), and other devices that communicate wirelessly.

In other embodiments (not shown in the figure), the communication means can use any of a variety of communication standards, protocols and technologies, including, but are not limited to, global system for mobile communications (GSM), enhanced data GSM environment (EDGE), high-speed downlink packet access (HSDPA), wideband code division multiple access (W-CDMA), code division multiple access (CDMA), time division multiple access (TDMA), BLUETOOTH®, wireless fidelity (Wi-Fi) (for example, IEEE802.11a, IEEE802.11b, IEEE802.11g or IEEE802.11n), Voice over Internet Protocol (VOIP), Wi-MAX, email protocol (e.g., Internet Message Access Protocol (IMAP) and/or post office protocol (POP)), instant messaging (e.g., Extensible Message and Online Protocol (XMPP). Session Initiation Protocol (SIMPLE) or Instant Message and Online Service (IMPS), or Short Message Service (SMS), or any other suitable communication protocol, including those developed and not yet completed since the date of submission of this document.

In some embodiments, the ultrasonic transmitter 3500 can be provided with sensors and amplifiers to further improve the mosquito repellent effect. In other embodiments (not shown in the figure), the sensing devices include but are not limited to accelerometers, optical devices, electromagnetic and capacitive sensors, contact devices, transducers, displacement transducers, piezoelectric sensors, piezoresistive devices, variable capacitors, servo devices and audio devices, wherein the transmission of vibration can be gas, liquid or solid, including but not limited to microphones and seismic telephones.

Suitable accelerometers include, but are not limited to, piezoelectric (PE); high impedance output: integrated electron piezoelectricity (IEPE): low impedance output piezoresistive (PR); variable capacitance (VC) of silicon strain gauge sensor: low level and low frequency servo force balance; and the like.

In other embodiments (not shown in the figure), amplifiers include, but are not limited to, sample-and-hold amplifiers, peak detectors, logarithmic amplifiers, anti-logarithmic amplifiers, instrumentation amplifiers, programmable gain amplifiers, and the like.

In the use process, the host machine is taken out of the storage cavity, then the host machine is fixed on the top of the base, the power cord of the fan is inserted into the power socket, and the switch of the fan is turned on, at this time, the fan starts to work, and the ultrasonic transmitter also starts to emit ultrasonic waves, so that mosquitoes and flies can be effectively driven away. When the fan needs to be stored after use, the switch and power supply of the fan are first turned off, the host machine is removed from the top of the base, and then the host machine is re-inserted into the storage cavity of the base. If the user has multiple fans, each fan can be stacked and stored through the base, thus saving space and being convenient to carry.

The insect and fly expelling fan provided by the application of the present invention is not limited to shops such as fruit stalls and cooked food stalls. In the broad aspect of the application of the present invention, the insect and fly repellent fan convenient for storage can also be applied to the following scenes, such as outdoor activities, such as picnics, camping, barbecues and the like, which can effectively repel mosquitoes and improve the comfort of outdoor activities: or family use, such as use in the kitchen, dining room, bedroom and other places at home, which can effectively drive away mosquitoes and protect the health of family members: or commercial places, such as restaurants, cafes, bars and other commercial places, can provide customers with a comfortable environment, or agricultural application, used in farmland, farms and other places, can effectively drive away pests and protect the health of crops and poultry.

The insect and fly expelling fan provided by the present invention has the following advantages. First of all, the device is easy to store, and the fan can be stored conveniently when not in use through the unique design, saving space: secondly, the fan has good anthelmintic effect, and the device combines physical and chemical anthelmintic methods, which can not only drive insects and flies by ultrasonic waves, but also release anthelmintic agents through anthelmintic tablets, thus achieving better anthelmintic effect. At the same time, the equipment has high flexibility, and users can adjust the direction of the fan according to their needs, making it more flexible to adapt to various environments. Moreover, the design of the fan can provide an extra storage space while occupying a small space. Generally speaking, the design of the application of the present invention fully considers the needs of users and usage scenarios and has strong practicability. At the same time, due to its portability and high efficiency, it has good application prospects in many scenarios.

The terms "comprising." "including." "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. An insect and fly expelling fan convenient for storage, comprising a base and a host machine detachably connected to said base,
   wherein, a storage cavity is formed in a middle of said base, said storage cavity is of a hollow structure, a fixing device is formed in said storage cavity, and said host machine is detachably attached inside said storage cavity through said fixing device;
   wherein said fixing device is a clamping table which is encircled on said storage cavity, said clamping table is a convex structure formed on an inner wall of said storage cavity, and said clamping table is configured to clamp said host machine; and
   wherein, said base and said host machine can pivot relative to each other, and said insect and fly expelling fan convenient for storage has a working state and an accommodated state through a detachable connection between said base and said host machine; and
   when said insect and fly expelling fan convenient for storage is in said working state, said host machine is fixedly connected to a top of said base through a fastener; and
   when said insect and fly expelling fan convenient for storage is in said accommodated state, said host machine is accommodated in said base through said storage cavity.

2. The insect and fly expelling fan convenient for storage according to claim 1, wherein said fixing device is composed of a plurality of fixtures, wherein said fixtures are fixed on the inner wall of said storage cavity, have a strip structure, and are made of flexible materials, and when said host machine is accommodated in said storage cavity, said fixtures clamp said host machine.

3. The insect and fly expelling fan convenient for storage according to claim 1, wherein said fixing device is a fixing buckle extending from the inner wall of said storage cavity, and the cross section of said fixing buckle is triangular, so that when said host machine is accommodated in said storage cavity, said fixing buckle clamps said host machine tightly.

4. The insect and fly expelling fan convenient for storage according to claim 1, wherein a bottom of said base is provided with a hand ring and a groove, and a limiting step is also formed at a top of said storage cavity, wherein said hand ring is made of a ductile material, and said hand ring and said groove are semicircular in structure, and sizes thereof are matched; and said hand ring is rotatably accommodated in said groove, and said host machine can be embedded and installed into said storage cavity from bottom to top after being detached.

5. The insect and fly expelling fan convenient for storage according to claim 1, wherein said host machine comprises a casing, and said base and said host machine are detachably connected by a rotary fastening mode; and said fastener comprises a buckling part arranged at a lower part of said casing and a mating part arranged at an upper part of said base, and said buckling part and said mating part are connected by a rotary fastening mode.

6. The insect and fly expelling fan convenient for storage according to claim 1, wherein said host machine further comprises fan blades, wherein said fan blades are made of a ductile material, and a number of said fan blades is three; and said fan blades can be bent and attached to the periphery of said casing, wherein,
   when said insect and fly expelling fan convenient for storage is in said working state, said fan blades can rotate away from said base; and
   when said insect and fly expelling fan convenient for storage is in said accommodated state, said fan blades are static and close to said bottom of said base.

7. The insect and fly expelling fan convenient for storage according to claim 1, wherein said host machine further comprises a motor, and said motor is arranged above the inside of said casing; and at least a part of said motor extends out of said casing and is engaged with said fan blades.

8. The insect and fly expelling fan convenient for storage according to claim 1, wherein a bottom of said casing is provided with a charging interface and a lamp bead, and a battery is arranged inside, wherein said charging interface is electrically connected with said battery and said lamp bead flashes when said battery is charged.

9. The insect and fly expelling fan convenient for storage according to claim 1, wherein a PCB board is fixed inside said casing, and a switch is arranged outside, wherein both said switch and said motor are electrically connected with said PCB board, and said switch controls the operation of said motor through said PCB board.

10. The insect and fly expelling fan convenient for storage according to claim 1, wherein said accommodating vessel is further provided with at least two covers, wherein said covers comprise a first cover and a second cover and said first cover and said second cover are provided with a plurality of through holes and said through holes are evenly circumferentially arranged on said first cover and said second cover.

11. The insect and fly expelling fan convenient for storage according to claim 10, wherein said first cover can rotate relative to said second cover, and said first cover is located above said second cover, wherein said accommodating vessel has a volatile state and a closed state through rotation of said first cover; and
   said first cover is rotated so that said through holes on said first cover and said second cover are at a same position, and at this time, said accommodating vessel is in said volatile state; and
   the first cover is rotated so that said through holes on said first cover and said second cover are staggered, and said accommodating vessel is in said closed state.

12. The insect and fly expelling fan convenient for storage according to claim 1, wherein said insect and fly expelling fan convenient for storage is of a rotating body structure, and said host machine and said storage cavity are of approximately cylindrical structures, wherein an overall structure of said base is a conical part gradually decreasing from the bottom to the top, and a diameter of said storage cavity gradually decreases from bottom to top, and a maximum diameter of said host machine is equal to a diameter of the top of said storage cavity, so that said host machine is fixed in said storage cavity.

13. The insect and fly expelling fan convenient for storage according to claim 12, wherein a diameter of an upper end of said base is smaller than a maximum diameter of said storage cavity, and said base can be stacked in multiple ways, wherein at least a part of said base can be embedded and fixed in said storage cavity when said base is stacked.

14. The insect and fly expelling fan convenient for storage according to claim 1, wherein said host machine comprises a casing, and said base and said host machine are detachably connected by rotating threads, wherein said fastener comprises an internal thread arranged at a lower part of said casing and an external thread arranged at an upper part of said base, and said internal thread and said external thread are connected by rotation.

* * * * *